US011979377B2

(12) United States Patent
Oizumi et al.

(10) Patent No.: US 11,979,377 B2
(45) Date of Patent: May 7, 2024

(54) INTERNET CONNECTION MANAGEMENT SYSTEM FOR INFORMATION COMMUNICATION DEVICE, METHOD THEREFOR, AND INTERNET CONNECTION MANAGEMENT PROGRAM INSTALLED IN INFORMATION COMMUNICATION DEVICE

(71) Applicant: FREEBIT CO., LTD., Tokyo (JP)

(72) Inventors: Hiroshi Oizumi, Tokyo (JP); Akihiro Takehi, Tokyo (JP); Yutaka Ishizaki, Tokyo (JP); Atsuki Ishida, Tokyo (JP)

(73) Assignee: Freebit Co., Ltd., Tokyo (JP)

( * ) Notice: Subject to any disclaimer, the term of this patent is extended or adjusted under 35 U.S.C. 154(b) by 345 days.

(21) Appl. No.: 17/312,299

(22) PCT Filed: Dec. 10, 2019

(86) PCT No.: PCT/JP2019/048192
§ 371 (c)(1),
(2) Date: Jun. 9, 2021

(87) PCT Pub. No.: WO2020/122040
PCT Pub. Date: Jun. 18, 2020

(65) Prior Publication Data
US 2022/0029963 A1 Jan. 27, 2022

(30) Foreign Application Priority Data
Dec. 10, 2018 (JP) .................................. 2018-231160

(51) Int. Cl.
*H04L 9/40* (2022.01)
(52) U.S. Cl.
CPC ........ *H04L 63/0272* (2013.01); *H04L 63/101* (2013.01)

(58) Field of Classification Search
CPC .............. H04L 63/0272; H04L 63/101; H04L 43/0876; H04L 41/0806; H04L 43/028;
(Continued)

(56) References Cited

U.S. PATENT DOCUMENTS

2007/0055752 A1  3/2007  Wiegand et al.
2010/0293610 A1* 11/2010  Beachem .............. H04L 63/107
726/13
(Continued)

FOREIGN PATENT DOCUMENTS

CN      1761206 A     4/2006
CN    101076976 A    11/2007
(Continued)

OTHER PUBLICATIONS

Extended Search Report and Opinion received in European Application No. 19894592.5, dated Jul. 4, 2022, 10 pages.
(Continued)

*Primary Examiner* — Beemnet W Dada
(74) *Attorney, Agent, or Firm* — Haynes and Boone, LLP

(57) ABSTRACT

A system for managing connection from a smartphone 1 provided to a child to specific connection destinations via the Internet, comprising: a filter server 9 for restricting packet transmission to the Internet based on a destination of the packet and a source IP of the smartphone 1; a VPN server 6 for establishing a tunnel connection 27 between the VPN server 6 and the smartphone 1, wherein the tunnel connection 27 passes all communication traffic from the smartphone 1, and also transmitting to the filter server the packet which passed through the tunnel connection 27; and an API server 8 connected to the VPN server 6 for confirming existence of the tunnel connection 27 at predetermined
(Continued)

timing and, when lack of the existence is determined, blocking the Internet connection itself of the information communication device.

12 Claims, 3 Drawing Sheets

(58) Field of Classification Search
CPC . H04L 43/0811; H04L 63/0236; H04L 45/50; H04L 12/66
See application file for complete search history.

(56) References Cited

U.S. PATENT DOCUMENTS

| | | |
|---|---|---|
| 2014/0250222 A1 | 9/2014 | Rangappan |
| 2015/0156183 A1* | 6/2015 | Beyer .................. H04L 63/145 726/4 |
| 2015/0188949 A1 | 7/2015 | Mahaffey |
| 2016/0119211 A1 | 4/2016 | King et al. |
| 2016/0308907 A1 | 10/2016 | Le |
| 2017/0279803 A1 | 9/2017 | Desai |
| 2018/0131719 A1 | 5/2018 | Amit |
| 2018/0213574 A1 | 7/2018 | Bareket et al. |
| 2019/0013967 A1 | 1/2019 | Ishii et al. |

FOREIGN PATENT DOCUMENTS

| | | |
|---|---|---|
| CN | 101212374 A | 7/2008 |
| CN | 102118353 A | 7/2011 |
| CN | 107171855 A | 9/2017 |
| JP | 2005286802 A | 10/2005 |
| JP | 2014049783 A | 3/2014 |
| JP | 2017059926 A | 3/2017 |
| KR | 100703567 B1 | 4/2007 |
| KR | 20160115873 A | 10/2016 |
| WO | 2012132697 A1 | 10/2012 |
| WO | 2013171380 A1 | 11/2013 |
| WO | 2014084967 A1 | 6/2014 |
| WO | 2017014164 A1 | 1/2017 |

OTHER PUBLICATIONS

Japan Patent Office, International Search Report dated Jan. 21, 2020, PCT/JP2019/048192, 4 pages.
China National Intellectual Property Administration, Office Action for CN201980082024.7, dated Nov. 30, 2023, 12 pages.

* cited by examiner

INTERNET CONNECTION MANAGEMENT SYSTEM FOR INFORMATION COMMUNICATION DEVICE, METHOD THEREFOR, AND INTERNET CONNECTION MANAGEMENT PROGRAM INSTALLED IN INFORMATION COMMUNICATION DEVICE

CROSS REFERENCE TO RELATED APPLICATIONS

The present application is a U.S. National Stage patent application of International Patent Application No. PCT/JP2019/048192, filed Dec. 10, 2019; which claims priority from Japan Patent Application No. 2018-231160, filed on Dec. 10, 2018, both of which are hereby incorporated by reference in their entirety for all purposes.

FIELD OF THE INVENTION

The present invention relates to a system and method thereof as well as an Internet connection management program for managing connectivity of applications which utilize Internet connection at mobile information communication devices such as smartphones.

BACKGROUND OF THE INVENTION

In recent years, there has been a rapidly increasing number of criminal cases targeting underage population. For this reason, many parents are hoping to restrict connection made by their child or children to harmful Internet sites.

Here, it is relatively easy to restrict connection to the Internet if the device used by the child to connect to the Internet is a computer or the like which is always connected to a local network at home. That is, in this case, connection destinations and/or usage time may be restricted in a detailed manner by installing a function called "parental control" in a router and the like for controlling the network traffic.

However, when the devices used by the child to connect to the Internet are smartphones, they are by definition mobile, and therefore, they connect not only to a particular mobile network, but also to different local networks wherever the devices go, in which case, the network-specific parental control such as above is no longer effective.

To address this problem, there has been contemplated a method for restricting the connection by pre-installing pre-determined apps on the smartphones used by the child/children to thereby restrict launching of video-watching apps and/or filter predetermined connection destinations. However, this method is incapable of preventing workaround actions such as using apps other than the restricted ones in order to watch video contents. For example, restricting the launch of apps dedicated for watching videos alone may not restrict watching videos by browsers.

Also, it is impossible to effectively restrict connection to harmful websites and their contents if their IP addresses are frequently changed because the feasible restriction on connection destinations at the terminal level is directed only to predetermined URL character strings and/or specific IP addresses. In addition, children with some computer knowledge may, on their own, be able to uninstall the apps restricting the other apps' launch such as above.

SUMMARY OF THE INVENTION

Problem to be Solved by the Invention

Considering the above situation, the purpose of the present invention is to provide a system for effectively managing connectivity of an application which utilizes a network at a mobile information communication device such as a smartphone.

Means for Solving the Problem

In order to achieve the above object, according to a first principal aspect of the present invention, there is provided a system for managing connection from an information communication device to specific connection destinations via the Internet, comprising: a filter server for restricting packet transmission to the Internet based on a destination of the packet and a source IP of the information communication device; a VPN server for establishing a tunnel connection between the VPN server and the information communication device, wherein the tunnel connection passes all communication traffic from the information communication device, and also transmitting to the filter server the packet which passed through the tunnel connection; and an existence confirmation server connected to the VPN server for confirming existence of the tunnel connection and, when lack of the existence is determined, blocking the Internet connection itself of the information communication device.

According to such a configuration, by building a tunnel connection with VPN, all traffic from the information communication device may be always transmitted through the filter server regardless of the type of the local network and/or the mobile network to thereby ensure the filtering.

Also, according to the above configuration, the system may operate to use the existence confirmation to detect any attempts by a user of the information communication device to avoid using the tunneling connection (VPN) running on the information communication device, and block the mobile network itself. Thus, the communication line itself stops operating if the tunnel connection by VPN is avoided, rendering the information communication device useless, and the user will have no choice but to continue using the present system.

Here, according to one embodiment of the present invention, the information communication device is capable of connecting to the Internet via a mobile communication network, and the existence confirmation server blocks the Internet connection itself by blocking mobile communication network connection of the information communication device.

According to another embodiment, the existence confirmation by the existence confirmation server is performed by sending an existence confirmation notification to the information communication device and receiving a response therefrom.

According to yet another embodiment, in the information communication device, there is installed a VPN connection module for establishing a tunnel connection with the VPN server regardless of the type of network to which the information communication device connects.

According to still another embodiment, the system further comprises a filter setup server for configuring a filter rule to be set in the filter server, wherein the filter setup server accepts external accesses and selectably presents filter candidates.

According to yet another embodiment, in the information communication device, there is installed an existence confirmation module for sending a VPN existence confirmation notification to the existence confirmation server.

According to still another embodiment, the existence confirmation module sends the existence confirmation notification in response to the existence confirmation from the existence confirmation server.

According to a second principal aspect of the present invention, a method for managing connection from an information communication device to specific connection destinations via the Internet, comprising the steps of: filtering by a filter server for restricting packet transmission to the Internet based on a destination of the packet and a source IP of the information communication device; establishing VPN by a VPN server for establishing a tunnel connection between this VPN server and the information communication device, wherein the tunnel connection passes all communication traffic from the information communication device, and also transmitting to the filter server the packet which passed through the tunnel connection; and confirming existence by an existence confirmation server connected to the VPN server for confirming existence of the tunnel connection and, when lack of the existence is determined, blocking the Internet connection itself of the information communication device.

Also, according to a third principal aspect of the present invention, a connection management application installed in an information communication device, said connection management application for managing connection from the information communication device to specific connection destinations via the Internet, comprising: a VPN access module for establishing a tunnel connection between the information communication device and a VPN server, wherein the tunnel connection passes all communication traffic from the information communication device, and a VPN existence confirmation module for confirming existence of the tunnel connection at predetermined timing and, when lack of the existence is determined, notifying an existence confirmation server configured to block the Internet connection itself of the information communication device.

Characteristics of the present invention other than the claimed characteristics will be disclosed in the following description of the preferred embodiments and the accompanying drawings.

DETAILED DESCRIPTION OF THE INVENTION

One embodiment of the present invention will be described below in accordance with accompanying drawings.

Figure 1:
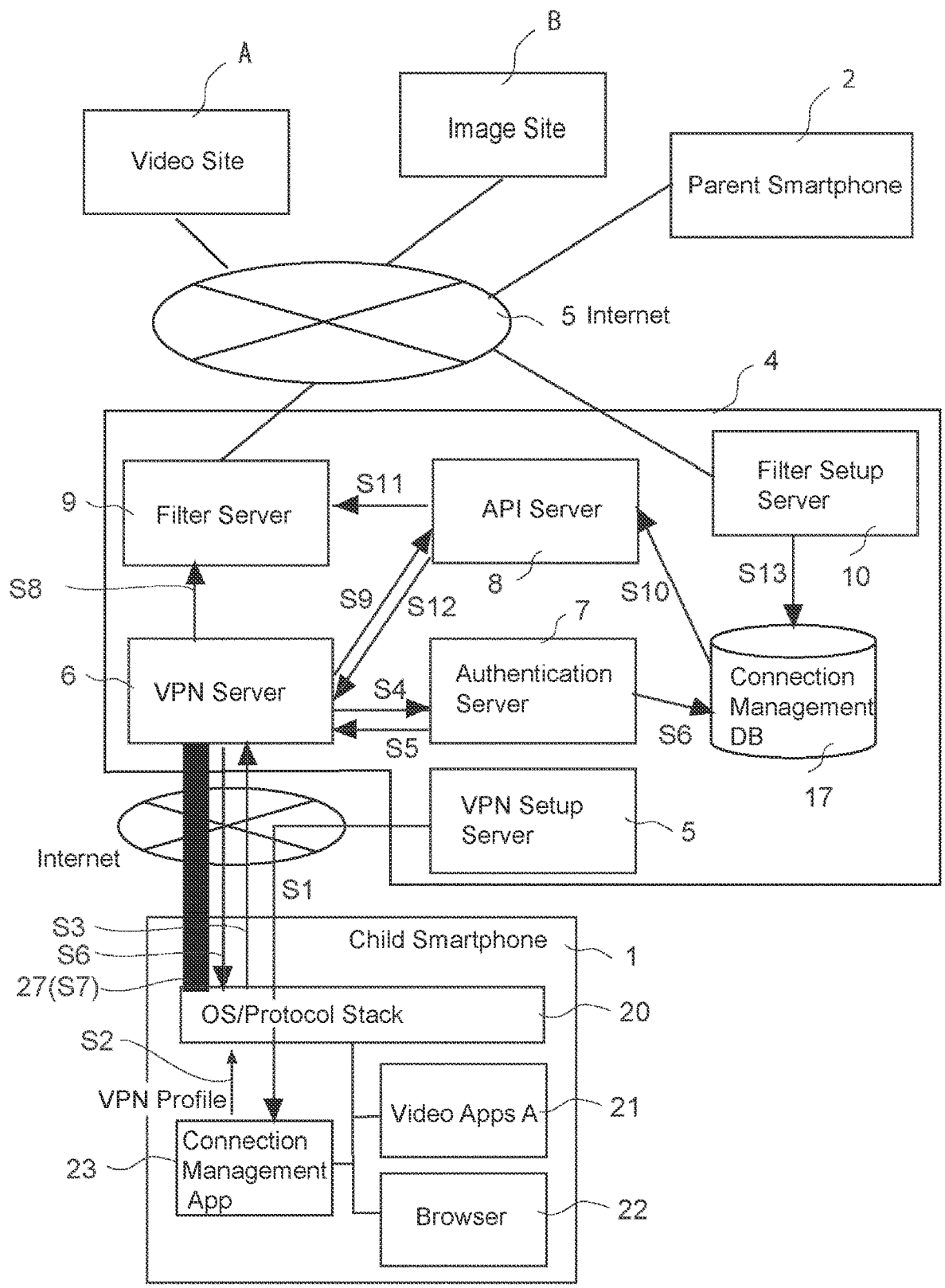
FIG. 1 is a schematic structural view showing an Internet connection management system according to one embodiment of the present invention.

FIG. 1 shows a system configuration of this embodiment. In the figure, indicated with 1 is a smartphone (child smartphone) given to a child from a parent, who is a subscriber; and indicated with 2 is the parent's smartphone (parent smartphone), which is used to configure the child smartphone's filter, or a PC (parent PC).

Here, the child smartphone 1 connects to the Internet via a connection management system 4, which is the embodiment of the present invention, and the child smartphone 1 is adapted to be capable of connecting to desired video site A, image site B and the like through the Internet. Also, the parent smartphone 2 is adapted to be capable of connecting to the connection management system 4 via the Internet and defining a filter rule configured for the child smartphone 1.

Additionally, the connection management system 4 comprises a VPN setup server 5, a VPN server 6, a user authentication server 7, a API server 8, a filter server 9 and a filter setup server 10.

When the child smartphone 1 is activated, the VPN setup server 5 performs terminal authentication for the child smartphone 1 via the Internet, and passes to the child smartphone a VPN profile required for a VPN tunnel connection. Based on the VPN connection profile, the VPN server 6 establishes and maintains a steady tunnel connection between the VPN server 6 and the child smartphone 1, wherein the tunnel connection passes all of the communication traffic from the child smartphone 1. The user authentication server 7 communicates with the VPN server 6 and grants each child smartphone 1 a virtual IP address for the VPN connection.

Figure 2:
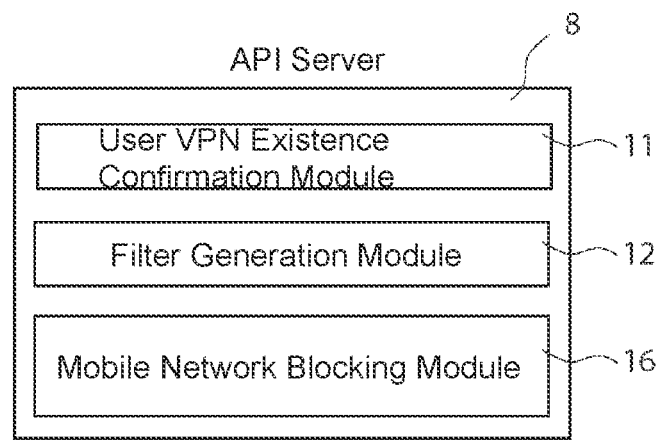
FIG. 2 is a schematic structural view showing an API server according to the embodiment of the present invention.

On the other hand, the API server 8, as shown in FIG. 2, comprises a VPN existence confirmation module 11, a filter generation module 12 and a mobile network blocking module 16. The VPN existence confirmation module 11 communicates with the VPN server 6 and the child smartphone 1 and manages the connection status as to if the tunnel connection of each child smartphone 1 is being maintained, whereas the filter generation module 12 generates a connection management filter for each child smart phone 1 based on its existence confirmation, and passes the connection management filter to the filter server 9. Also, the mobile network blocking module 16 blocks the mobile network connection itself from the child smartphone 1 if its existence confirmation by the VPN existence confirmation module 11 fails for a certain time period or under a certain condition.

Figure 3:
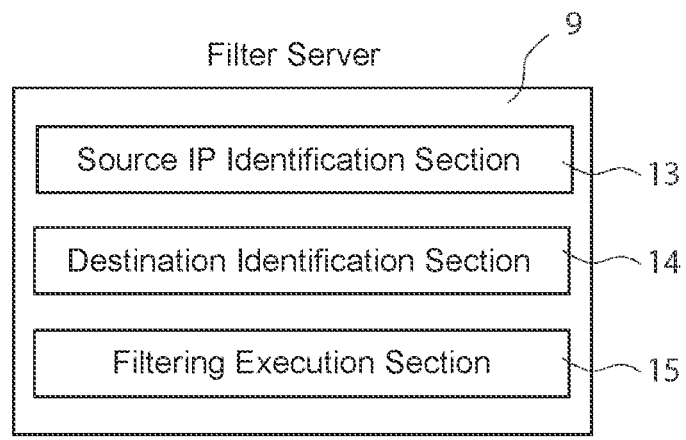
FIG. 3 is a schematic structural view showing a filter server according to the embodiment of the present invention.

As shown in FIG. 3, the filter server 9 comprises a source IP identification section 13, a destination identification section 14 and a filtering section 15. The source IP identification section 13 compares a source IP address contained in a packet or packets with the filter received from the API server 8 and identifies a user (the child smartphone 1) for the connection restriction. The destination identification section 14 identifies a communication destination by intervening in negotiations for the IP address, port and SSL to check a host name part, compares the host name part with the filter received from the API server 8 and determines whether or not the connection to the destination should be blocked. If the packet is determined to be restricted for its transmission based on the results from the determination sections 13, 14, the filtering section 15 is adapted to restrict the transmission to the Internet by applying or removing the filter.

Further, the filter setup server 10 (FIG. 1) accepts an access from the parent smartphone 2 to allow external filter rule setting. In this embodiment, a number of destinations to be filtered are currently prepared in advance, and a user is to choose destinations for restriction from the prepared ones.

Figure 4:
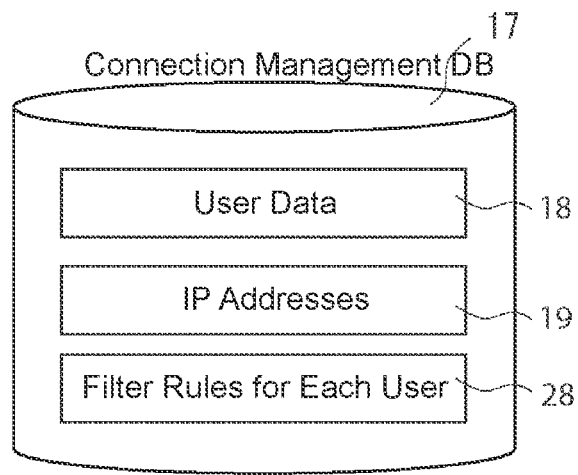
FIG. 4 is a schematic structural view showing a connection management DB according to the embodiment of the present invention.

The filter rule set by the parent is stored in a connection management DB 17. As shown in FIG. 4, this connection management DB 17 has stored therein user data 18 including user IDs, virtual IP addresses 19 of users (child smartphones) and filter rules 28 for the respective users. Note that the restricted destinations prepared in advance and presented in a filter rule are contemplated to be specific video sites and the like, for example, and the filter setup server 10 stores those site names in association with their URLs and IP addresses in the filter rule. Also, IP address updates are monitored and, if there is such an update, the filter rules are also updated accordingly.

Additionally, in the child smartphone 1 as shown in FIG. 1, there are installed a mobile operating system (OS)/protocol stack 20 as well as various user apps including a video (browsing) app 21 and/or a browser 22. These apps 20, 21 is adapted to utilize the OS protocol stack 20 to thereby enable communication via the Internet with predetermined protocols such as TCP/IP and the like with predetermined servers (e.g., the video server 6, the image server 7, etc.

Also in this child smartphone 1, a connection management app 23 is installed for operating on the OS 20 and guiding all traffic on this child smartphone to the system. This connection management app 23 is installed on this child smartphone 1 by a telecommunications carrier and adapted to launch when this smartphone is activated.

Figure 5:
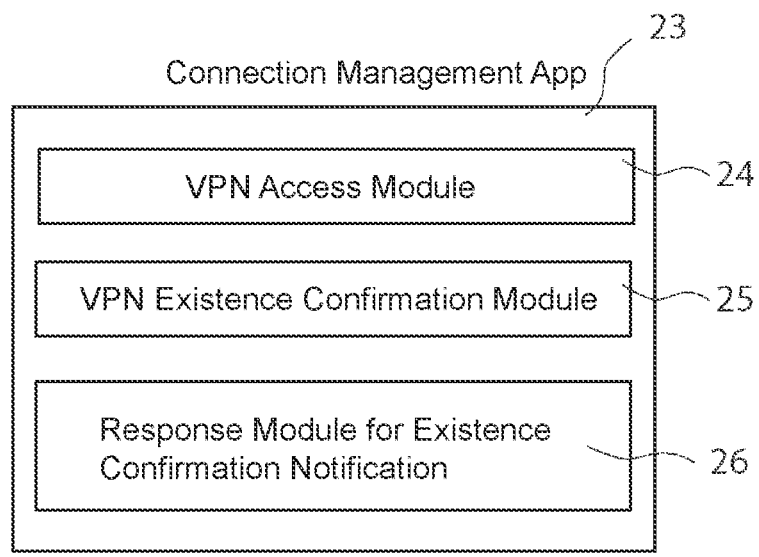
FIG. 5 is a schematic structural view showing a connection management app according to the embodiment of the present invention.

In addition, as shown in FIG. 5, this connection management app 23 comprises a VPN access module 24 for passing the VPN profile to the OS, a VPN existence confirmation module 25 for confirming at regular time intervals as to whether or not the VPN connection is alive and a response module 26 for receiving the existence confirmation notification from the API server 8 and responding to it.

A detailed configuration of the above system will be disclosed below in reference with its operations. Note that S1-S20 in FIG. 1 are symbols corresponding with the following Steps S1-S20, respectively.

In this embodiment, the child smartphone 1 is provided by, for example, a smartphone seller being a mobile network operator through mail order such as TV shopping and the like, and the connection management app 23 is preinstalled in the child smartphone 1.

When a user activates the child smartphone 1, the connection management app 23 automatically launches and communicates with the VPN setup server 5 to thereby receive a VPN profile from the VPN setup server 5 (Step S1). This VPN profile includes an address of the VPN server 6 and information identifying the user (a user ID).

The connection management app 23 sends the received VPN profile to the OS/protocol stack 20 (Step S2). Thus, the OS/protocol stack 20 sends a request to establish a TCP/IP tunnel connection to the VPN server 6 (Step S3).

Upon receipt of the request to establish a tunnel connection, the VPN server 6 sends a query to the user authentication server 7 to perform user authentication (Step S4). The authentication server 7 performs user connection authentication and assigns a predetermined virtual IP address to the user (Step S5). Then, the authentication server 7 stores the virtual IP address in the connection management DB 17 in association with a user ID of the user.

After the user's virtual IP address is assigned, the VPN server 6 sends this virtual IP address to the OS/protocol stack 20 of the child smart phone 1 (Step S6). Thus, communication packets will be capsulated using the virtual IP address and an IP address of a connection destination and a tunnel connection 27 is established between the child smartphone 1 and the VPN server 6 (Step S7). This tunnel connection 27 is terminated at the VPN server 6, where the communication packets are decapsulated and passed to the filter server 9 (Step S8). Accordingly, all subsequent communication packets from the child smartphone 1 to the Internet will be transmitted through the tunnel connection 27, the VPN server 6 and the filter server 9.

Meanwhile, once the tunnel connection 27 is established, the VPN server 6 notifies that as well as the user ID and the source IP address of the child smartphone to the API server 8 (Step S9). Thus, the VPN existence confirmation module 11 of the API server 8 (FIG. 2) acknowledges that a VPN has been configured for a particular user, and subsequently retrieves a filter rule for that particular user from the connection management DB 17 and sets the filter rule in the filter server 9 as a connectivity control filter (Step S10, S11).

Note that the destinations whose traffic should be restricted are determined via the filter setup server 10. As noted previously, in this embodiment, a number of destinations to be filtered are currently prepared in advance, and the user is to choose destinations for restriction from the prepared ones. The configured filter information is stored in the connection management DB 17, retrieved as needed from the API server 8 (Step S10) and set in the filter server 9 (Step S11).

As described above, destination candidates for connection restriction are preferably updated as needed. Also, the IP addresses associated with their respective destination names are preferably updated as needed, and when updated, the filter rules stored in the connection management DB 17 are updated accordingly.

Further, the API server 8 is adapted to configure the filter, and then, send an existence confirmation notification to the child smartphone 1 through the VPN server at regular time intervals (Step S12). If the VPN connection is alive, the response module 26 of the child smartphone 1 is adapted to return a notification accordingly to the API server 8.

If no notification as an indication of existence is returned for a certain a period of time, the mobile network blocking module 16 of the API server 8 blocks the mobile network connectivity itself of the child smartphone 1. Thus, the mobile network blocking module 16 prevents any connection bypassing the VPN connection.

Moreover, the existence confirmation module 25 of the child smartphone 1 confirms the existence of the tunnel connection 27 at regular intervals; if the confirmation fails or if some unknown error occurs, the existence confirmation module 25 causes the OS/protocol stack 20 to attempt re-establishment of the VPN connection.

According to such a configuration, all traffic from the child smartphone may be always transmitted through the filter server regardless of the type of the local network and/or the mobile network to which the smartphone connects, to thereby ensure the filtering.

Furthermore, according to the above embodiment, since the connection restriction is performed on a per-destination basis, this restriction is effective regardless of the app used on the child smartphone. In other words, the present embodiment allows to solve the problem of the prior art restriction methods, where launching of specific apps, for example, a video-watching app, in the smartphone may be restricted, but the user may use a browser on the same smartphone instead to watch videos.

Also, according to this embodiment, it may operate to detect any attempts by the user of the child smartphone to avoid using the tunneling connection (VPN) running on the child smartphone, and block the mobile network itself. That is, the communication line itself stops operating if the VPN usage is avoided, rendering the smartphone useless, and the user will have no choice but to continue using the present system.

It should be noted that the present invention is not limited to the above one embodiment, and that various changes and modifications may be made without departing from the spirit and scope of the present invention.

For example, in the above one embodiment, the destinations for connection restriction were selected from the prepared list for the filter setup server, but the destination IP addresses may be directly entered as well.

Further, the VPN existence confirmation module 25 provided in the child smartphone 1 responded to the existence confirmation from the API server, but the present embodiment is not limited by this, and the smartphone 1 may issue the existence confirmation notification by itself at regular intervals.

Moreover, in the above one embodiment, the user's information communication device was a smartphone, but it is not limited by that and may be other mobile information communication devices including personal computers, tablets and the like.

DESCRIPTION OF THE REFERENCE NUMBERS

A. Video site
B. Image site
1. Child smartphone
2. Parent smartphone
4. Connection management system
5. VPN setup server
6. VPN server
7. User authentication server
8. API server
9. Filter server
10. Filter setup server
11. VPN existence confirmation module
12. Filter generation module
13. Source IP identification section
14. Destination identification section
15. Filtering section
16. Mobile network blocking module
17. Connection management DB
18. User data
19. IP addresses
20. OS/protocol stack
21. Video app
22. Browser
23. Connection management app
24. VPN access module
25. VPN existence confirmation module
26. Response module
27. Tunnel connection
28. Filter rule

The invention claimed is:

1. A system for managing Internet connection from an information communication device to a specific connection destination Internet Protocol (IP) address via the Internet, comprising:

a filter server for restricting packet transmission to the Internet based on a destination IP address of the packet and a source IP address of the information communication device;

a Virtual Private Network (VPN) server for establishing a tunnel connection between the VPN server and the information communication device, wherein the tunnel connection while established passes all Internet communication traffic from the information communication device, and also transmitting to the filter server the packet which passed through the tunnel connection; and an Application Programming Interface (API) server capable of blocking mobile network connection of the information communication device, wherein the API server comprises:

a VPN existence confirmation module connected to the VPN server for confirming existence of the tunnel connection and, a mobile network blocking module configured to block access to the Internet by way of a mobile network connection of the information communication device in the event that the VPN existence confirmation module determines that the tunnel connection is absent.

2. The system of claim 1, wherein:

the existence confirmation by the VPN existence confirmation module is performed by sending an existence confirmation notification to the information communication device and receiving a response therefrom.

3. The system of claim 1, wherein:

in the information communication device, there is installed a VPN connection module for establishing the tunnel connection with the VPN server regardless of the type of network to which the information communication device connects.

4. The system as in claim 1, further comprising:

a filter setup server for configuring a filter rule to be set in the filter server, wherein the filter setup server accepts external accesses and selectably presents filter candidates.

5. The system of claim 1, wherein:

in the information communication device, there is installed an VPN existence confirmation module for sending a VPN existence confirmation notification to the VPN existence confirmation module of the API server.

6. The system of claim 5, wherein:

the VPN existence confirmation module of the information communication device sends the existence confirmation notification in response to the existence confirmation from the VPN existence confirmation module of the API server.

7. A method for managing Internet connection from an information communication device to a specific connection destination Internet Protocol (IP) address via the Internet, comprising the steps of:

filtering by a filter server for restricting packet transmission to the Internet based on a destination IP address of the packet and a source IP address of the information communication device;

establishing a VPN connection by a Virtual Private Network (VPN server for establishing a tunnel connection between this VPN server and the information communication device, wherein the tunnel connection, while established, passes all Internet communication traffic from the information communication device, and also transmitting to the filter server the packet which passed through the tunnel connection; and blocking, by an Application Programming Interface, API, server (8), a mobile network connection of the information communication device (1), wherein the step of blocking the mobile network connection by the API server (8) further comprises:
connecting to the VPN server (6) and
checking for existence of the tunnel connection by a VPN existence confirmation module provided in the API server, and,
if absence of the tunnel connection is determined by the VPN existence confirmation module, blocking, by a mobile network blocking module provided in the API server, access to the Internet by way of the mobile network connection of the information communication device.

8. The method of claim 7, wherein:
the existence checking by the step of confirming existence of the tunnel connection is performed by sending an existence confirmation notification to the information communication device and receiving a response therefrom.

9. The method of claim 7, further comprising the step of:
establishing the VPN connection by the information communication device for establishing the tunnel connection between the information communication device and the VPN server regardless of the type of network to which the information communication device connects.

10. The method of claim 7, further comprising the step of:
setting a filter by a filter setup server for configuring a filter rule to be set in the filter server,
wherein the step of setting the filter accepts external accesses and selectably presents filter candidates.

11. The method of claim 7, further comprising the step of:
confirming existence by the information communication device for sending a VPN existence confirmation notification to the VPN existence confirmation module of the API server.

12. The method of claim 11, wherein:
the step of confirming existence of the tunnel connection sends the existence confirmation notification by a VPN existence confirmation module provided in the information communication device in response to the existence confirmation from the VPN existence confirmation module of the API server.

* * * * *